TELEVISION RECEIVERS

Filed Nov. 20, 1952

INVENTOR

Louis W. Parker

United States Patent Office 2,885,469

Patented May 5, 1959

2,885,469

TELEVISION RECEIVERS

Louis W. Parker, Great Neck, N.Y.

Application November 20, 1952, Serial No. 321,582

13 Claims. (Cl. 178—5.8)

This invention relates to television receivers and especially those of the type using the intercarrier sound system.

This application is the continuation in part of my prior copending application Serial No. 312,981, filed October 3, 1952, entitled Intercarrier Television Receiver, now Patent No. 2,826,633 of March 11, 1958.

The principles of intercarrier sound systems are well known in the art, one description of them may be found in my U.S. Patent No. 2,448,908, granted September 7, 1948 and entitled Television Receiver. For this reason there will be no discussion of these principles in the following specification. The term "intercarrier frequency" as will be used in the specification and claims is intended to designate the beat frequency between picture and sound carriers. According to present standards of the Federal Communications Commission this frequency difference is 4.5 megacycles. Should these standards be changed by specifying a different carrier frequency spacing the term "intercarrier frequency" will designate the new frequency difference between the picture and sound carriers.

The primary object of this invention is to provide an improved system for extracting intermediate frequency carrier signals from an intercarrier television circuit.

Another object of the invention is to provide an intercarrier television receiver circuit which will deliver a control signal which varies according to the tuning of the receiver, and in the preferred form of the invention is a maximum when the tuning is optimum.

Other additional objects will be apparent from the specifications that follow.

Intercarrier television receivers normally have a video frequency amplifier fed from the output of the superheterodyne circuit. The signal fed to this amplifier is usually a demodulated one from which the intermediate frequency signal has been substantially completely removed. The present invention contemplates sufficient capacitive coupling between an amplifier (of the superheterodyne circuit) which has an intermediate frequency signal therein and said video frequency amplifier whereby a small intermediate frequency signal appears therein. Means are provided to extract the amplified intermediate frequency signal from said video amplifier and to use this latter signal for control purposes.

My invention will now be explained in connection with one embodiment thereof.

Figure 1:
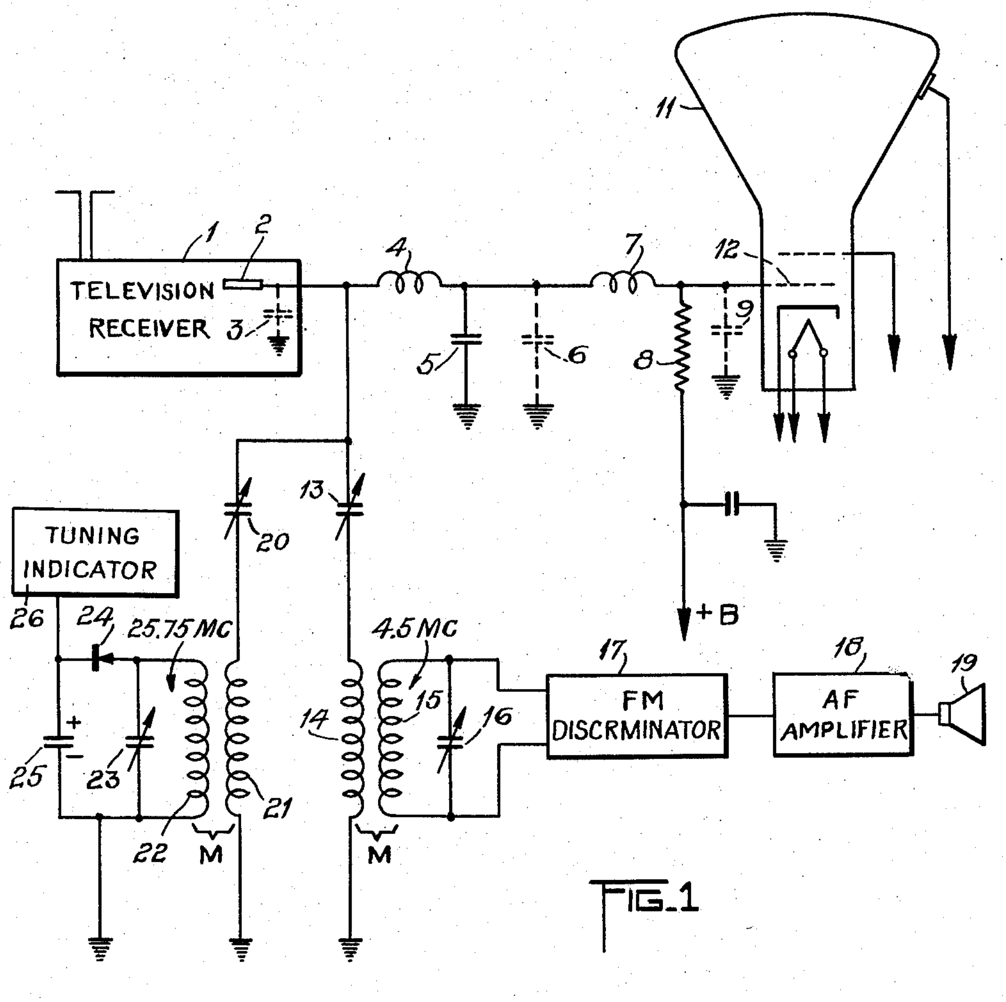
Fig. 1 is a schematic diagram view of so much of a well known form of video output circuit as is necessary to explain the construction and operation of my improved arrangement for extracting the intercarrier frequency and the intermediate frequency picture carrier.

Referring first to the old elements of the circuit on Fig. 1, it will be seen that a conventional intercarrier television receiver 1 is supplying video signals to cathode ray tube 11 thru a so-called double π filter coupling network, made up of elements 3, 4, 5, 6, 7, 8 and 9. The plate of the last video amplifier tube 2 is shown in block 1 in order to designate the fact that the above filter coupling is connected to that plate.

The filter which couples the plate 2 of the video amplifier to the grid 12 uses two coils 4 and 7 in series and three condensers 3, 5 and 9, the middle one of which 5 has twice the capacity value of each of the end ones 3 and 9. The load resistor 8 of the filter is also the plate resistor of tube 2.

In some cases a similar circuit is used which is generally spoken of as shunt series peaking. In such instances the control potential (impressed between grid 12 and the cathode) of the cathode ray tube 11 is obtained from across condenser 5. In addition to this form of shunt series peaking there are still other forms. The values of the inductive, capacitive and resistive elements are usually determined by different methods in this form of peaking than the above filter coupling, but insofar as my invention is concerned no great difference exists between the two forms of output circuits. Any form of peaking is useful in my present invention as long as it represents a high impedance at 4.5 mc. and 25.75 mc. looking from the plate of the last video amplifier. Another form of such peaking useful with my invention is the conventional series peaking circuit.

The filter 4, 5, 6, 7 and 9 serves the function of allowing video signals to pass to the cathode ray tube but attenuating the 4.5 mc. sound carrier, and the intermediate carrier signals. So far as the invention claimed in this case is concerned any other means that will serve the above functions may be substituted for parts 4 to 9 incl.

A further attentuation of the intercarrier frequencies is accomplished by series resonance circuit 13, 14. This circuit represents a low impedance path to 4.5 mc. where it is tuned. As far as the filter coupling 3, 4, 5, 6, 7 and 9 is concerned, it represents a resistance at 4.5 mc. and a low capacity condenser for video frequencies. In order not to increase the inherent capacity too much at plate 2, the value of condenser 13 is made low (5 to 10 mmf.). It may be variable as shown or fixed and the inductance of coil 14 varied with a "slug." This resonant coil 14 has a comparatively high inductance necessitated by the very low capacity in series with it. When operating a high RF voltage is developed across it, however if any appreciable capacity is added across this coil, the voltage is greatly reduced. For this reason another coil 15 is placed in inductive relation to coil 14 and resonated by condenser 16 at 4.5 megacycles. This condenser may be variable from 5 to 25 mmf. The discriminator 17, such as for example a 6BN6 tube is placed across condenser 16 and the capacity so added is then removed from condenser 16.

The function of parts 13 to 16 incl., is to allow the 4.5 mc. sound carrier to pass to the FM discriminator 17 and to attenuate other frequencies such as the video signals and the intermediate frequency. Any other parts which accomplish this function may replace parts 13 to 16 incl., so far as the present claims are concerned. An intercarrier receiver with parts 13 to 16 incl. is claimed in my said prior copending application S.N. 312,981.

The picture IF carrier which will be assumed for purposes of this description to be 25.75 mc., is also extracted from plate 2 of the video amplifier in television receiver 1. Series resonance circuit 20—21 as well as parallel resonance circuit 22—23 perform in a similar manner as did series resonance circuit 13—14 and parallel resonance circuit 15—16, except that the capacitive and inductive values of the elements are made smaller in order to operate at 25.75 mc. instead 4.5 mc. A rectifier diode 24 rectifies this IF frequency and the resulting direct potential is accumulated across high capacity condenser 25 (about 0.1 microfarad). The D.C. control potential thus developed may be employed to control a tuning indicator 26 thereby to give an audible tuning indication, e.g. by controlling the bias on an audio frequency amplifier in the receiver and/or it may be employed to give a visual indication at 26, e.g. by controlling a "tuning eye" of known construction, all as has been described in my prior copending application Serial No. 307,222, filed Aug. 30, 1952. In order to use this D.C. potential to "turn on" the AF amplifier when tuning is correct, as shown in my prior copending patent application S.N. 307,222, the polarity of the D.C. potential should preferably be positive with respect to ground. As described in that application, the AF amplifier is normally negatively biased to almost cut off and therefore its output is slight or zero. When tuning is correct, the IF voltage appearing across coil 22 is rectified. The resulting positive potential is applied to the grid of the AF amplifier where it overcomes the excessive negative bias and renders the amplifier operative. In this way correct tuning is indicated by increased sound volume. Of course the amplitude of this positive D.C. potential has to be limited so as to operate equally well on high and low RF signal levels. Such limiter and other pertinent matters are described in my above mentioned patent application S.N. 307,222.

Figure 2:
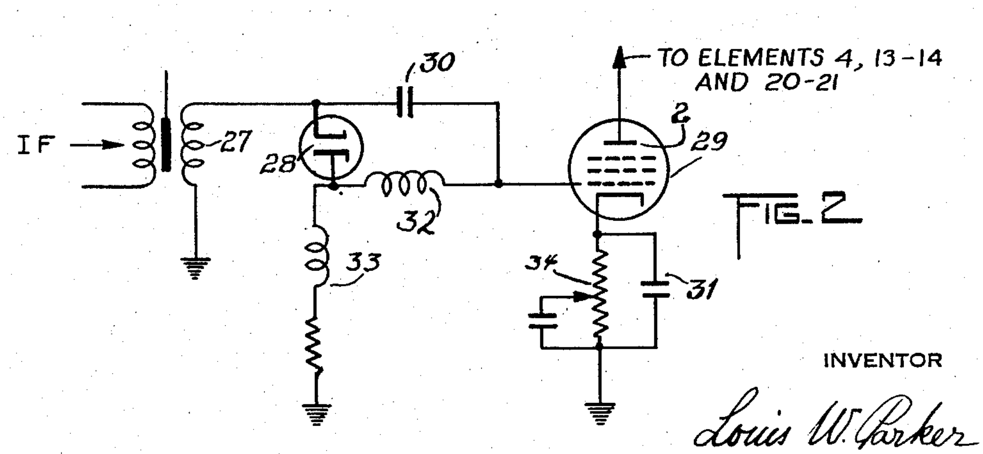
Fig. 2 is a schematic diagram of an arrangement for increasing the amplitude of the intermediate frequency picture carrier, and comprises a detail of box 1 of Figure 1.

Most of the picture IF carrier reaches the video amplifier thru the capacity between the plate and grid of the diode detector. This capacity in the 6AL5 diode is about 3 micromicrofarads. The IF signal voltage at plate 2 of the video amplifier (Figures 1 and 2) can be appreciably increased, if desired, by bridging a small condenser between the high potential side of the IF output coil and the grid of the VF amplifier. Such a bridging condenser 30 is shown in Fig. 2 and it must be understood that the circuit of Figure 2 may in fact be considered to comprise a portion of the block 1 of Figure 1, with video amplifier 29 of Figure 2 corresponding to the video amplifier shown in block 1 of Figure 1. Figure 2 shows a conventional diode detector circuit 28, obtaining IF voltage from transformer 27 and after rectification feeding the VF signals to VF amplifier 29. The peaking circuits 32—33 are also conventional, and, as mentioned previously, all of the components 27 through 34, shown in Figure 2, may in fact be included in block 1 of Figure 1 preceding the junction of elements 4, 13—14, and 20—21. Condenser 30 serves as a bridge in order to increase the amplitude of the picture IF carrier leading to the video frequency amplifier. The value of this condenser is very low (in the order of 3 micromicrofarads). The upper limit of this capacity is determined mainly by the ability of the VF amplifier to handle the various frequencies without intermodulation. In some cases the VF amplifier cannot stand any increase of the various signals it receives even without the addition of condenser 30. For such cases of course the condenser must not be used and the IF picture carrier present due to other capacities and couplings must be relied on.

It was found experimentally, that without using condenser 30 and coil 32, the D.C. potential across condenser 25 on a fair RF signal was 15 volts and with a 3 micromicrofarad condenser 30 used for bridging, the D.C. potential was 27 volts. These tests were made with a 1N54 germanium crystal diode. When using a 6AL5 diode, the respective voltages were 35 and 60. These voltages vary somewhat with the strength of the received signal in spite of the automatic gain control action. The contrast control 34 usually employed on the video amplifier does not affect the output much, since low capacity bypass condenser 31 eliminates degeneration on 25.75 mc. as well as on 4.5 mc. However if desired condenser 31 may be left out and the 25.75 mc. signal may be stabilized somewhat by the fact that at weak signals the contrast control is turned higher by the operator and at these times an increased gain on the 25.75 mc. signal is also desirable.

Variation in the D.C. voltage which controls the AF output is undesirable when due to any reason other than tuning. For stabilization a diode limiter is employed as shown in my patent application Serial No. 307,222. In that application means to increase the D.C. potential are also shown. When using this present invention, in most cases such amplifying as well as isolating means were found unnecessary due to the high output obtained and the lack of any undesirable effect on the IF amplifier.

While I have shown and described certain preferred embodiments of my invention, it will be understood that modifications and changes may be made without departing from the spirit and scope thereof, as will be clear to those skilled in the art.

In this application I have particularly pointed out and distinctly claimed the part, improvement or combination which I claim as my invention or discovery, and I have explained the principles thereof, and the best mode in which I have contemplated applying those principles so as to distinguish my invention from other inventions.

What I claim:

1. In an intercarrier type television receiver; heterodyne means for producing an intermediate frequency picture carrier signal having a band of video modulations and a frequency modulated sound carrier signal having frequencies outside of said band, said means having an output; a diode second detector, an inductor and an amplifier in series with said output and connected each to the next in the order named; a condenser one side of which is connected to said output and the other side of which is connected to said amplifier; said condenser having insufficient capacity to effect intermodulation of signals in said amplifier; a picture tube; means coupling the amplifier to the picture tube including a filter for passing the video signals and rejecting the others; a sound system; means coupling the amplifier to the sound system including means for passing the frequency modulated sound signals and rejecting the other signals, and a resonant circuit tuned to the frequency of said intermediate frequency picture carrier and connected to the output of said amplifier for producing a signal indicative of the tuning adjustment of said receiver and useful to effect accurate tuning of said receiver to a recei ed signal.

2. In an intercarrier type television receiver, means responsive to a received signal for producing an intermediate frequency picture carrier signal having a band of video modulations and a sound carrier of a frequency outside said band, said means having an output, a second detector in said output for demodulating said intermediate frequency picture carrier signal and for producing an intercarrier frequency having sound components, an amplifier coupled to said second detector for amplifying said demodulated picture carrier signals, a picture tube, means coupling said amplifier to said picture tube including means for attenuating said intercarrier and intermediate frequency picture carrier signals and for allowing the video band to pass, a sound reproducer, means coupling said second detector to said sound reproducer including means for attenuating signals at the frequency of said intermediate frequency picture carrier as well as signals in said video band and for allowing said intercarrier frequency to pass, capacitive means coupling a portion of the intermediate frequency picture carrier from said output to the input of said amplifier, whereby said amplifier also amplifies a portion of said intermediate frequency picture carrier signal, and control means coupled to said amplifier and responsive to the amplified intermediate frequency picture carrier signals appearing at the output of said amplifier for giving a tuning indication during tuning of said receiver.

3. The combination of claim 2 in which said capacitive means comprises a condenser shunted across said second detector.

4. In a tunable intercarrier type television receiver including means responsive to a received composite signal for producing an intermediate frequency picture carrier signal having a band of video modulations and a sound carrier of a frequency outside of said band, means including a second detector coupled to said first mentioned means and operative to produce video signals, intercarrier frequency signals, and intermediate frequency picture carrier signals at said second detector, a video amplifier coupled to said second detector, a picture tube, means coupling said video amplifier to said picture tube including first frequency selective means for allowing only the video band to pass, sound reproducer means, means coupling said video amplifier to said sound reproducer means including second frequency selective means for allowing only said intercarrier frequency signals to pass, additional means connected between said second detector and said amplifier for increasing the intermediate frequency picture carrier signal output of said video amplifier, and means having a resonant element tuned to the frequency of said intermediate frequency picture carrier signal and coupled to the output of said video amplifier for giving a tuning indication in response to said intermediate frequency picture carrier signal.

5. An intercarrier television receiver as defined in claim 4 in which the additional means is a condenser.

6. An intercarrier television receiver as defined in claim 4 in which the additional means is a condenser of such small capacity that intermodulation of signals in said amplifier is avoided.

7. In an intercarrier type television receiver, means for producing an intermediate frequency picture carrier signal having a band of video modulations and a sound carrier having a frequency outside said band, said means having an output, an amplifier, means connecting said output to said amplifier, said last-named means comprising means for rectifying part of the current passing from the output to the amplifier, whereby said last-named means is operative to produce and couple a video signal and an intercarrier frequency signal to said amplifier, means for transmitting current at the frequency of said intermediate frequency picture carrier from said output to said amplifier by capacitive coupling whereby the intermediate frequency picture carrier signal also appears in said amplifier, a picture tube, means coupling said amplifier to the picture tube including means for allowing only the video band to pass, a sound system, means coupling the amplifier to the sound system including means for allowing only said intercarrier frequency to pass, and receiver tuning means coupled to said amplifier and controlled by the intermediate frequency picture carrier signals appearing in the output of said amplifier.

8. In an intercarrier type television receiver having means responsive to a received signal for producing an intermediate frequency picture carrier signal having a band of video modulations and a sound carrier of a frequency outside said band, a video amplifier, detector means coupled to said first mentioned means and to said video amplifier, said detector means being operative to produce, at the input of said video amplifier, an intercarrier frequency signal as well as a further signal which is primarily a demodulated reproduction of the modulated intermediate frequency picture carrier signal but includes signals at the frequency of said intermediate frequency picture carrier of such limited amplitude that intermodulation of signals in said video amplifier is avoided, frequency selective control means coupled to the output of said video amplifier and controlled by the amplified intermediate frequency picture carrier signals appearing in the output of said video amplifier for giving a tuning indication during tuning of said receiver, a picture tube, means coupling said video amplifier to said picture tube including first frequency selective means for allowing substantially only the video band to pass to said picture tube, a sound system, and means coupling said video amplifier to said sound system including second frequency selective means for allowing substantially only said intercarrier frequency signal to pass to said sound system.

9. An intercarrier type television receiver as defined in claim 8 in which said control means for giving said tuning indication includes a series resonant circuit connected to the output of said amplifier and tuned to the frequency of said intermediate frequency picture carrier, and means coupled to said series resonant circuit for deriving energy therefrom whereby said derived energy may be employed to give said tuning indication.

10. An intercarrier television receiver including a second detector and a video amplifier, said receiver including means responsive to a received composite signal whereby video, intercarrier, and intermediate frequency picture carrier signals all appear at said second detector, means coupling at least a portion of all said video, intercarrier, and intermediate frequency picture carrier signals to said video amplifier, picture producing means, first frequency selective means coupled to said video amplifier for extracting and coupling said video signal from said video amplifier to said picture producing means, a sound system, second frequency selective means coupled to said video amplifier for extracting and coupling said intercarrier signal from said video amplifier to said sound system, tuning indicator means, and third frequency selective means coupled to said video amplifier for extracting and coupling said intermediate frequency picture carrier signal from said video amplifier to said tuning indicator means thereby to control said tuning indicator means.

11. In a television receiver, a tunable intercarrier receiver having a second detector stage, said receiver including means whereby video, sound and intermediate frequency picture carrier signals all appear in the output of said second detector stage, first means coupled to said second detector stage for extracting the video signals from said second detector stage and for isolating said video signals from the sound and intermediate frequency picture carrier signals, a picture tube controlled by said isolated video signals, a sound system, second means coupled to said second detector stage for extracting the sound signals from said second detector stage and for coupling said sound signals to said sound system, said sound system including means for demodulating said sound signals, third means coupled to said second detector stage for extracting the intermediate frequency picture carrier from the output of the second detector stage, said third means including a sharply peaked resonant device tuned to the frequency of the intermediate frequency picture carrier, rectifier means coupled to said tuned circuit, and tuning indicator means responsive to the rectified output of said tuned circuit.

12. The combination of claim 11 wherein said tuning indicator means comprises means giving an audible tuning indication.

13. The combination of claim 11 wherein said tuning indicator means comprises means giving a visual tuning indication.

References Cited in the file of this patent

UNITED STATES PATENTS

| | | |
|---|---|---|
| 2,498,488 | Fyler | Feb. 21, 1950 |
| 2,504,662 | Dome | Apr. 18, 1950 |
| 2,573,248 | Cotsworth | Oct. 30, 1951 |
| 2,584,386 | Hare | Feb. 5, 1952 |
| 2,773,119 | Parker | Dec. 4, 1956 |